Dec. 11, 1934.  E. L. SCHELLENS  1,984,088
TRAILER TRUCK FOR LOCOMOTIVES
Filed Oct. 1, 1931  4 Sheets-Sheet 1
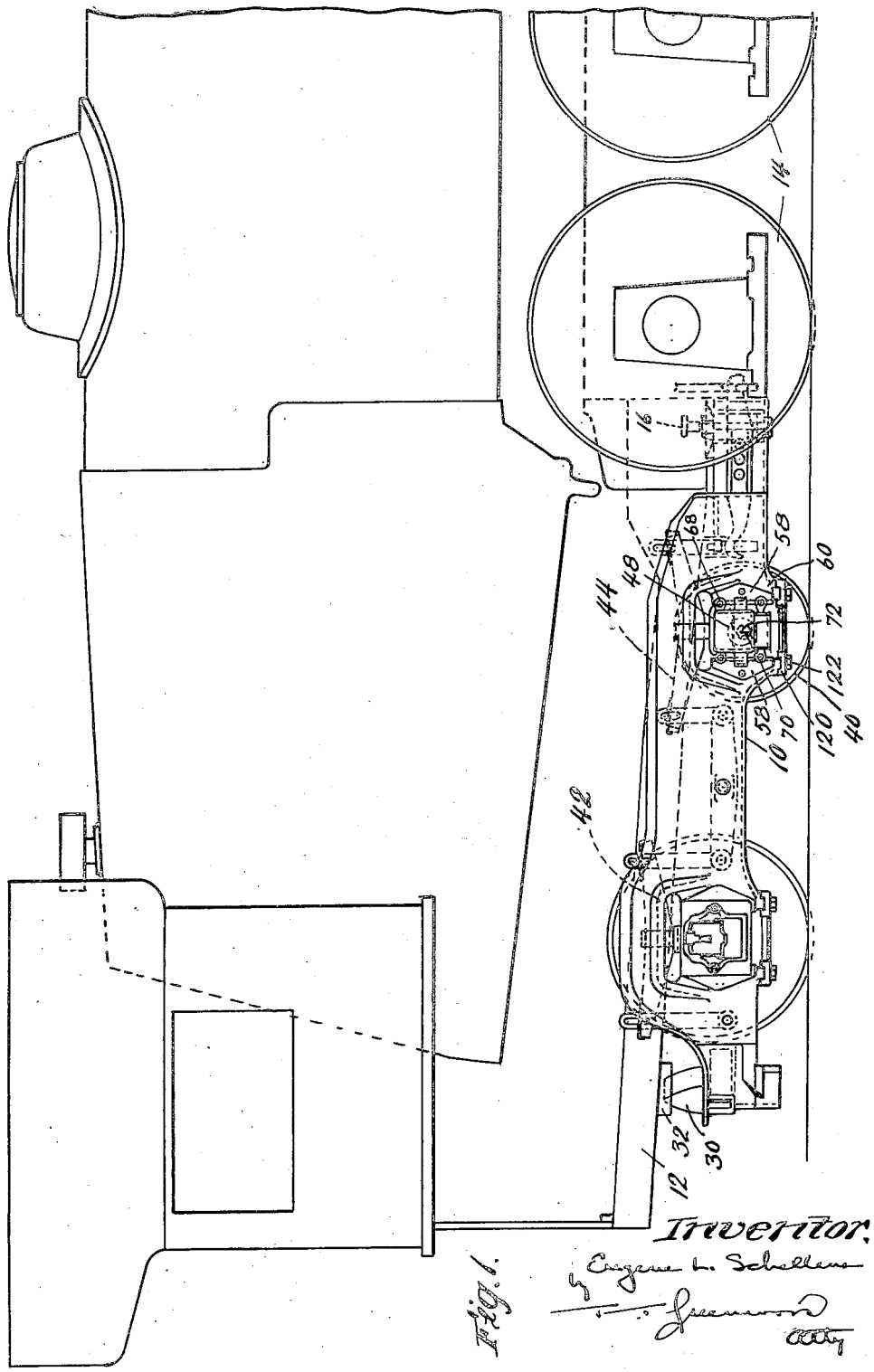

Dec. 11, 1934.  E. L. SCHELLENS  1,984,088
TRAILER TRUCK FOR LOCOMOTIVES
Filed Oct. 1, 1931  4 Sheets-Sheet 2
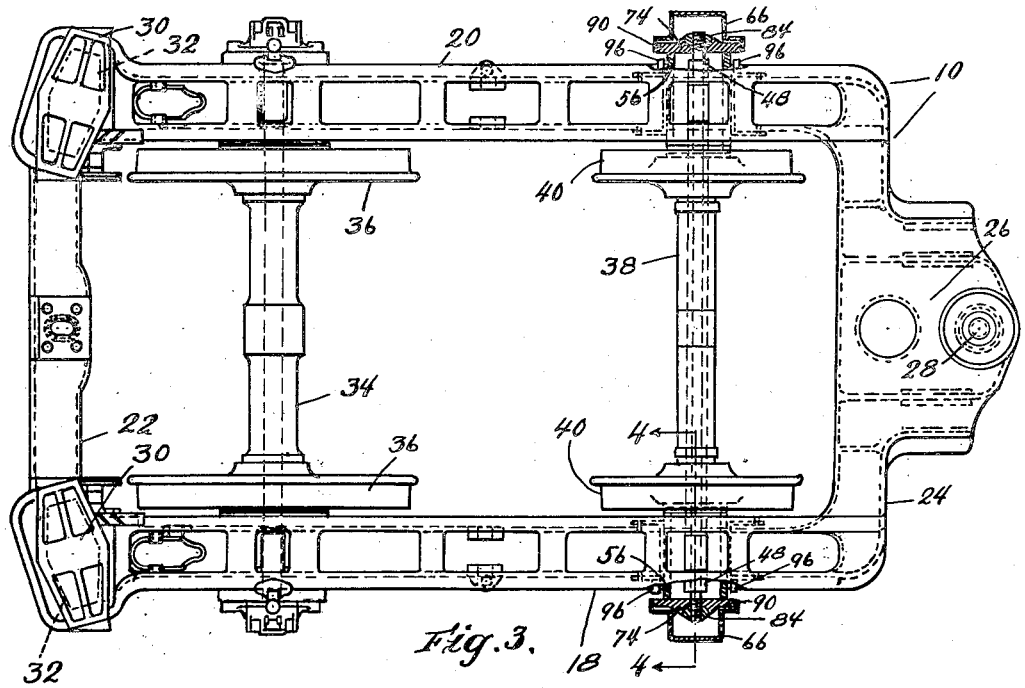
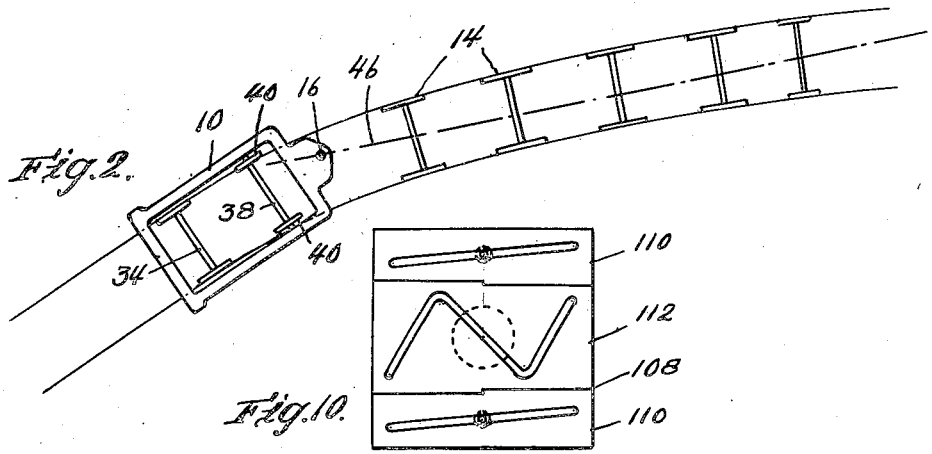
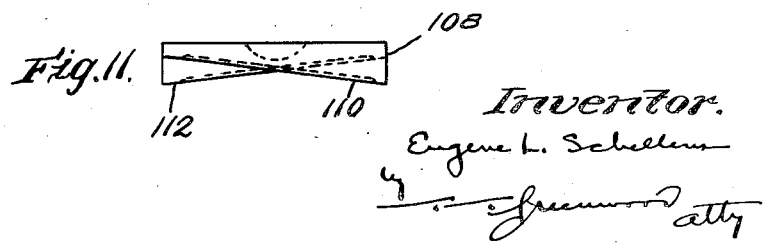

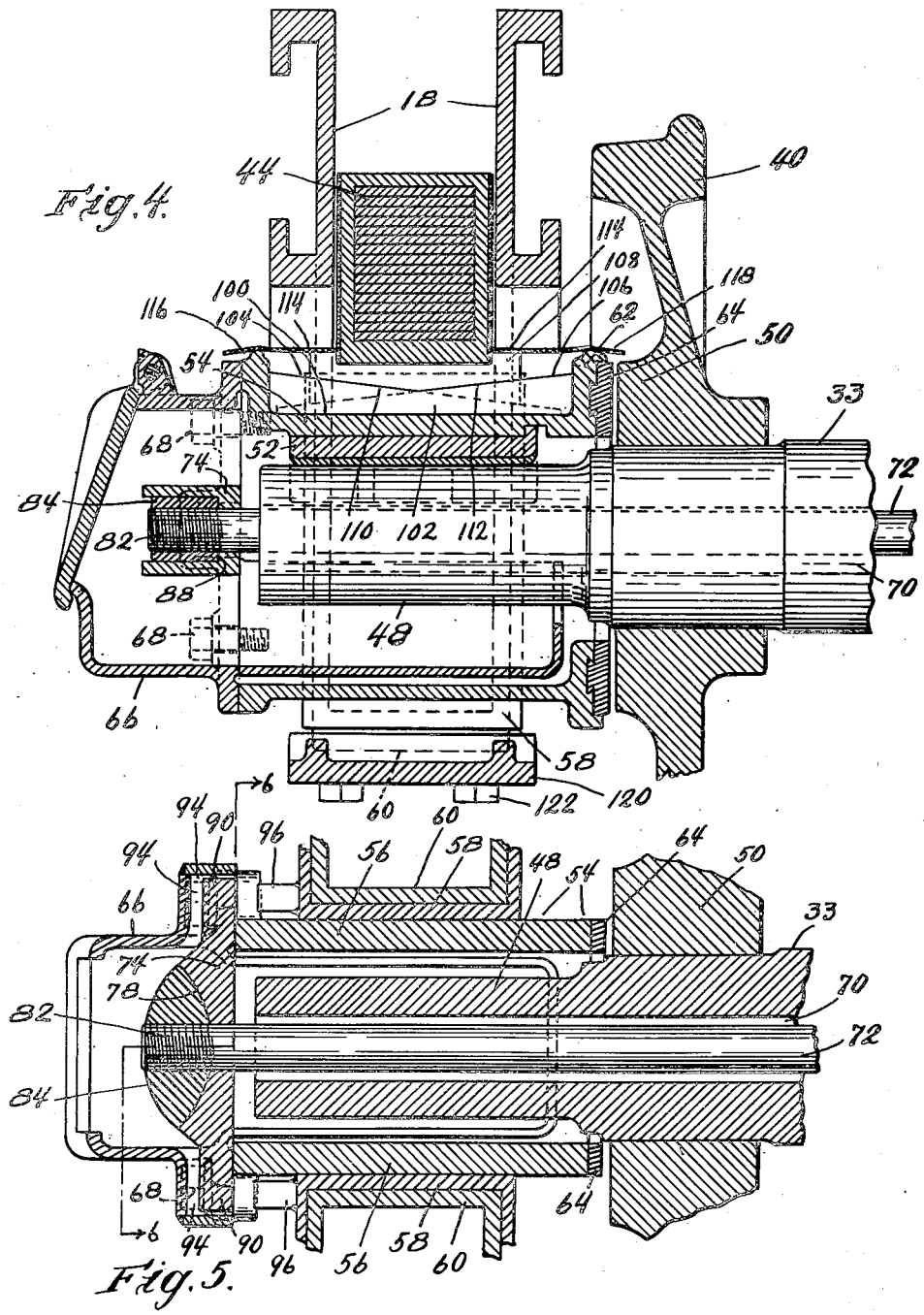

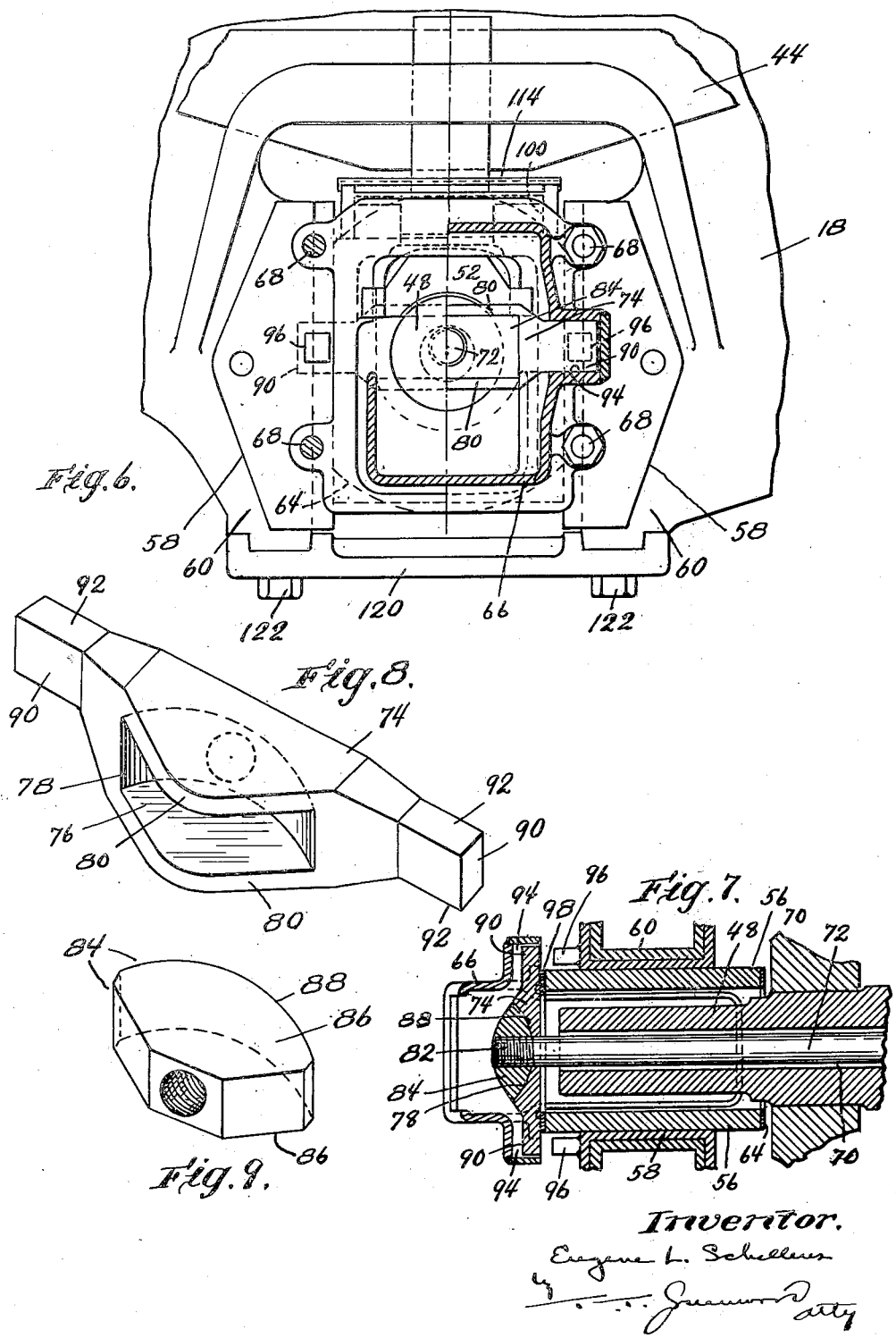

UNITED STATES PATENT OFFICE 1,984,088

TRAILER TRUCK FOR LOCOMOTIVES

Eugene L. Schellens, Ridgewood, N. J., assignor to C-S Engineering Company, Englewood, N. J., a corporation of Delaware Application October 1, 1931, Serial No. 566,238

13 Claims. (Cl. 105—174)

This invention relates to locomotives and to trailer trucks therefor and particularly, although in some of its features not limited, to trucks having a pair of wheeled axles, one of which is or may be connected with the booster engine.

The trailer truck is pivotally connected at its forward end with the main frame of the locomotive. When the locomotive travels over a curved section of track, the pivotal connection between the truck and the locomotive frame becomes displaced to one side or the other of the center line of the track with the result that heavy axial thrust is applied to the trailer axles, causing them to bear against the ends of their bearing boxes and to wear rapidly the end faces of the boxes. On curves of short radius the amount of lateral displacement of the truck would be sufficient to derail the truck were it not for the excessively great axial play permitted in one or both of the axles for the express purpose of avoiding derailment. Excessive axial play is not only dangerous, in itself, but it permits the wheel hubs to pound against the ends of the bearing boxes and to cut and rapidly wear the thrust faces thereof.

It is one of the objects of the present invention to provide a trailer truck wherein the above described objections are eliminated.

It is a further object of the invention to provide a trailer truck wherein excessive axial displacement between the axles and the bearing boxes thereof is unnecessary.

A further object is the provision of a trailer truck wherein the bearing boxes for an axle thereof are free for movement in the truck frame in an axial direction, or transversely of the frame, to permit relative displacement between the truck frame and the axle, and wherein the bearing boxes are connected together against undue relative displacement.

Another object is the provision of a trailer truck having a pair of wheeled axles, wherein one of the axles is journalled in bearing boxes located in the usual manner in the truck frame against axial displacement and wherein the other axle, and preferably the axle nearest the pivotal connection between the truck and the main frame of the locomotive, is journalled in bearing boxes that are free for axial displacement in the truck frame and are held against displacement relative to each other.

A further object is the provision of a trailer truck having an axially-displaceable wheeled axle with means tending to center it, and particularly the bearing boxes therefor, with respect to the truck frame.

Another object is the provision of a trailer truck having an axially-displaceable wheeled axle with means to center the axle with respect to the truck frame and means to center the truck with respect to the locomotive frame.

A further object is generally to improve the construction of trailer trucks for locomotives.

Fig. 1 is a side elevation of a trailer truck embodying the present invention, illustrated in position in a locomotive.

Fig. 2 is a diagrammatic view illustrating the lateral displacement of a trailer truck on a curved track.

Fig. 3 is a plan view of the truck of Fig. 1.

Fig. 4 is an enlarged sectional detail of one of the bearing boxes comprising a part of the present invention, taken along line 4—4 of Fig. 3.

Fig. 5 is a plan section of the box of Fig. 4.

Fig. 6 is an end elevation of the box, taken along line 6—6 of Fig. 5.

Fig. 7 is a view similar to Fig. 5 but showing the manner in which shims are applied to compensate for wear of the thrust plates of the bearing boxes while preserving the normal clearance between the thrust plates and wheels.

Fig. 8 is a perspective view of a tie rod yoke.

Fig. 9 is a perspective view of a tie rod nut.

Figs. 10 and 11 are plan and side elevations of a bearing plate for the axle-centering means.

As illustrated in Fig. 1 the trailer truck 10 with which this invention is concerned supports the main frame 12 of the locomotive in the rear of the sets of driving wheels 14 and at its forward end is pivoted to the locomotive frame by the king pin 16. The truck frame, see more particularly Fig. 3, comprises the opposed side members 18 and 20, the rear connecting member 22 and the front connecting member 24 which carries, located in the longitudinal axis of the truck, a seat 26 for the locomotive frame and a connection 28 for the king pin 16. At the junctions of the side members 18 and 20 and the rear connecting member 22 the truck is provided with centering devices comprising rockers 30 which rock on and upstand above the truck frame and which also rock on rocker plates 32 carried by the locomotive frame 12, whereby to permit of lateral displacement of the truck and main frame while maintaining a frame-supporting connection therebetween and also to resist such lateral displacement or transverse movement. The truck is also provided with a rear axle 34 having flanged wheels 36 and a front axle 38 having flanged wheels 40. The rear axle may be connected with a booster engine, not herein shown. Both axles are journalled in bearing boxes located in the usual bearing jaws of the side members. The rear axle and bearing construction is or can be in accordance with present practice, wherein the bearing boxes therefor are fixed against movement transverse the frame while the front axle and the bearings therefor are modified in accordance with the present invention. The truck is provided with the usual sets of interconnected springs 42 and 44 which bear upon the bearing boxes for the axles.

When the locomotive is rounding a curve of the track, the longitudinal axis 46 of the locomotive, at the point of its connection with the truck is displaced from the center line of the track, as is illustrated in Fig. 2. This displacement exerts a strong axial thrust on the truck axles, when they are adjusted for the desirable normal, or small, end play between their bearing boxes, and so causes excessive and rapid wear upon the thrust bearings at the inner ends of the boxes. In some instances, the lateral displacement of the truck can be so great as to effect the derailing of one of the sets of wheels, as illustrated by the wheels of the forward axle in Fig. 2, if there was not sufficient lateral displacement between the truck and the axles to prevent derailment.

In accordance with this invention one of the axles and its bearing boxes are so arranged that there can be any desired but constant amount of transverse movement between them and the truck while maintaining the boxes against independent displacement and while preserving the normal small end play of the axle. For the two-axled truck herein shown it is sufficient to so arrange but one of the axles which, preferably, is the forward axle 38.

The forward axle, at each end, is provided with an overhung, or out-board, journal 48, see especially Figs. 4 and 5, that extends outwardly beyond the wheel hub 50 and is seated upon an upper bearing 52 that is carried by and is located within a bearing box 54. Said box has parallel upstanding side walls 56 that are located between bearing plates 58 of box-jaws 60 of a side member of the truck frame. The box bears against the under side of the spring 44 and is movable vertically between the jaws 60 in the usual manner. The box has an outstanding flange 62 at its inner end which confronts the wheel hub and is provided with a thrust bearing plate 64 which is engaged by the wheel hub upon relative displacement between the truck and the axle. A normal and small amount of clearance, around a quarter of an inch, is provided between the wheel hub and the thrust plate. The open end of the box is closed by a housing 66 which is secured to the box by bolts 68.

While the usual bearing box such, for instance, as that supporting the rear axle 34 is held in the truck against axial displacement, in accordance with the present invention, the boxes for the front axle 38 are free to move axially in their respective side members of the frame. Thus the side walls of the box can move vertically and also horizontally between the jaws 60. The boxes, however, are connected together against independent transverse displacement. To this end, the axle 38 is hollow, or has an axial passage 70 therethrough, through which a tie rod 72 is extended, the passage being sufficiently greater in diameter than the diameter of the tie rod to permit the full permissible amount of wear of the journal bearing 52 without the engagement of the axle and rod. Yokes 74 are received loosely on the ends of said tie rod and extend on diametrically opposite sides thereof and overlie and bear against the outer end faces of the side walls 56 of each of the two bearing boxes. Each yoke is provided with a recess 76 having a cylindrical seat 78 and upstanding flanges 80. The tie rod is provided with screwthreaded ends 82 on each end of which a nut 84 is threaded and is located in the recess 76 of its corresponding yoke. The nut has opposed flat side faces 86 which engage the yoke flanges 80 so that the nut can not rotate independently of the yoke. The nut also has a cylindrical end face 88 which is seated on the cylindrical yoke-seat 78. The nuts are seated against the end of the screw threads on the tie rod, which threads are terminated at such distances apart as to provide for the normal clearance between the unworn thrust plates of the boxes and the wheel hubs when the yokes are in direct engagement with the boxes.

Each yoke 74 is provided with opposite ends 90 having parallel side walls 92 and located in corresponding passages 94 of the housing 66 so that the yokes are held against rotation although the yokes are free for movement in a direction axially of the axle and transversely of the truck. With this arrangement the boxes at the opposite ends of the axle 38 are connected against relative displacement. Thrust of a wheel on its associated box, to move it in one direction, causes the tie rod 72 to move the other bearing box the same amount in the same direction.

The truck jaws, or more particularly the bearing plates 58 thereof, are provided with outstanding abutment blocks 96 located on opposite sides of the axle 38 and under and in confronting relation with the ends 90 of the yokes 74 and are adapted to be engaged by the yokes to limit the axial displacement of the boxes, the thrust of a wheel on its associated box being transmitted through the tie rod 72 to the blocks adjacent the other wheel. The clearance between a yoke and its associated abutment blocks is relatively great, say, an inch, as compared with the clearance between a wheel and its associated thrust plate, and is intended to be sufficient to permit any reasonable and safe amount of relative displacement between the truck and axle. The arrangement is such that this amount of clearance, or relative displacement, can be maintained constant while the relative position between the box and the wheel hub can be adjusted to take up the play therebetween and compensate for wear on the thrust plate 64. To this end a shim 98, see Fig. 7, or a sufficient number of shims, is interposed between the yoke and the box, so as to position the box closer to the wheel hub by an amount equal to the wear of the thrust plate. The ends of the shim are located in the passages 94 of the housing 66, whereby they are held from rotation, and stop short of the abutment blocks 96 and so do not modify the clearance between them and the yoke.

Centering means is provided which positions the boxes, and consequently the axle, with respect to the truck and which opposes the transverse movement of the boxes and axle and which tends to restore them to normal position after they have been moved therefrom. To this end each bearing box is provided with a recess 100 in its upper wall in the bottom of which a bearing plate 102 is located and is fixed against axial displacement. Said plate is provided at its opposite sides with a pair of similar inclined or wedge faces 104 that, Fig. 4, are inclined downwardly from the left to the right, and an interposed and oppositely inclined or wedge face 106. A second and similar upper plate 108, see also Figs. 10 and 11, has inclined side or wedge faces 110 that engage the aforesaid faces 104 and an interposed oppositely inclined or wedge face 112 that engages the aforesaid face 106.

The upper plate 108 bears detachably against the spring 44 or, more particularly, the leaf-retaining band thereof, and is engaged thereby against displacement with respect thereto. With this arrangement, displacement of the box in opposite directions causes the bottom plate to ride over the opposite sets of inclined faces of the upper plate thereby flexing the spring 44 which opposes such displacement and, through the plates, tends to restore the box, and consequently the axle, to its normal position with respect to the truck. With this construction, the front axle takes a considerable proportion of the lateral thrust on the truck.

The plate recess 100 is adapted to contain a lubricant and has a cover 114 which is fixed with respect to the upper plate and has oppositely inclined sections 116 and 118 at its opposite ends that overlie the end walls of the recess, the inclinations of which sections correspond to the inclinations of the confronting plate-faces so that the sections retain their designed covering relation with the recess regardless of any displacement of the bearing box.

The open lower end of the space between the box jaws 60 is closed by a cap plate 120 which is secured removably on the ends of the jaws, under the box, by bolts 122. The inner end of the bearing box is free from any outstanding part which projects laterally beyond the jaws. Hence the box can be withdrawn from the truck frame by movement axially of the axle after having jacked up and blocked the spring 44 and having removed the nut 84 and the yoke 74 from the tie rod 72 and, if need be, the cap plate 120. This arrangement is quite desirable as it renders unnecessary the dropping of the axle with the box thereon to a position entirely clear of the truck frame, as has been heretofore the case.

I claim:

1. A trailer truck for locomotives comprising a truck frame having front and rear wheeled axles and bearing boxes therefor, the boxes for said rear axle being fixed in said frame against transverse movement with respect thereto, the boxes for said front axle being capable of such transverse movement, means connecting said movable boxes for conjoint transverse movement, centering means acting yieldingly on said boxes to hold them in a normal central position in said frame, said front axle being axially movable in its boxes, and said boxes having thrust plates which confront and are axially spaced from the wheels of said axle and limit the axial movement of said axle independently of the boxes therefor.

2. A trailer truck for locomotives comprising the combination of a truck frame having a forward end arranged for pivotal connection with the locomotive frame, centering devices at the rear end of said truck frame for positioning said truck frame with respect to the locomotive frame, a rear wheeled axle having bearing boxes which are fixed in said frame against movement transversely thereof, a front wheeled axle having bearing boxes in said frame, which boxes are capable of transverse movement with respect to said frame, a centering device separately engaged with each of said movable boxes for positioning them centrally with respect to their extent of movement in said truck frame, and means independent of said front axle for constraining said boxes for conjoint movement transversely of said frame.

3. A trailer truck for locomotives comprising a truck frame, bearing boxes therein which are free for movement transversely of said frame, a hollow wheeled axle journalled in said boxes, a tie rod passed through said axle having yokes at its ends which engage said boxes and connect them for conjoint transverse movement, and fixed abutments which are arranged to be engaged by said yokes for limiting transverse movement of said boxes in opposite directions.

4. A trailer truck for locomotives comprising a truck frame, bearing boxes therein which are free for movement transversely of said frame, a hollow wheeled axle journalled in said boxes, a tie rod passed through said axle having yokes at its ends which engage said boxes and connect them for conjoint transverse movement, housings on the ends of said boxes having passages in which the ends of said yokes are located, and fixed abutments which confront the ends of said yokes and limit transverse movement thereof.

5. A trailer truck for locomotives comprising a truck frame having bearing boxes which are movable transversely of said frame, a wheeled axle journalled in said boxes and movable endwise into engagement therewith, means which provides a predetermined amount of transverse movement of said boxes and axle, and means for adjusting said boxes transversely to compensate for endwise wear thereof while preserving said predetermined amount of transverse movement of said boxes and axle.

6. A trailer truck for locomotives comprising a truck frame having a bearing box which is movable transversely therein, an axle journalled in said box having a wheel which is movable against one end of said box, means which provides a predetermined amount of transverse movement of said box, and means for positioning said box transversely with respect to said wheel while preserving said predetermined amount of transverse movement of said box.

7. A trailer truck for locomotives comprising a truck frame, a bearing box therein which is movable transversely thereof and has a thrust bearing at its inner end, an axle journalled in said box having a wheel which confronts and is adapted to bear against said thrust bearing, means for limiting the amount of transverse movement of said box away from said wheel, and means for holding said box in positions which are successively closer to said wheel as wear on said bearing occurs, to preserve a constant distance between said wheel and said thrust bearing, while preserving constant the amount of transverse movement of said box.

8. A trailer truck for locomotives comprising a truck frame, a bearing box therein which is movable transversely thereof and has a thrust bearing at its inner end, a hollow axle journalled in said box having a wheel which confronts and is adapted to bear against said bearing, means which limits the amount of transverse movement of said box away from said wheel including a tie rod extended through said shaft having a yoke on its end which overlies and engages the outer end of said box, and a thrust bearing adjusting shim which is located between said yoke and said bearing.

9. A trailer truck for locomotives comprising a truck frame having spaced jaws, a cap plate overlying the open lower end of the space between and secured removably to said jaws, an axially movable bearing box located between said jaws, and a wheeled axle having an outboard journal located in said box, said box at its inner wheel-confronting end being free from any part which overlies said jaws so that said box can be withdrawn transversely of said truck frame out of the space between said jaws and off the end of said journal while maintaining said journal positioned between said jaws, and means for opposing axial movement of said box in opposite directions and for holding said box centrally located in said jaws.

10. A trailer truck for locomotives comprising a truck frame having spaced jaws, a wheeled hollow axle having an outboard journal located between said jaws, a bearing box between said jaws and supporting said journal, and a tie rod extended through said axle and having a yoke which overlies and bears against the outer face of said box, said yoke being removable from said tie rod and said box being free at its inner end from any projection which overlies said jaws so that said box can be removed transversely of said frame from the space between said jaws and at the same time off the end of said journal.

11. A trailer truck for locomotives comprising a truck frame having spaced jaws, a wheeled axle having an outboard journal located in the space between said jaws, an axially movable bearing box which is located between said jaws and supports said journal and can be withdrawn transversely of said frame from the space between said jaws and at the same time off the end of said journal, and means which opposes axial movement of said box in opposite directions and which retains said box yieldingly in a central position within said jaws.

12. A trailer truck for locomotives comprising a truck frame having spaced jaws, a wheeled axle having an outboard journal located in the space between said jaws, an axially movable bearing box which is located between said jaws and supports said journal and can be withdrawn transversely of said frame from the space between said jaws and at the same time off the end of said journal, means which opposes axial movement of said box in opposite directions and which retains said box yieldingly in a central position within said jaws, and means which connects said boxes so that they are constrained to move axially conjointly.

13. A trailer truck for locomotives comprising a truck frame having spaced jaws, a wheeled axle having an outboard journal located in the space between said jaws, an axially movable bearing box which is located between said jaws and supports said journal and can be withdrawn transversely of said frame from the space between said jaws and at the same time off the end of said journal, means which opposes axial movement of said box in opposite directions and which retains said box yieldingly in a central position within said jaws, and means which connects said boxes so that they are constrained to move axially conjointly, said means comprising a tie rod extended through said axle and having removable yokes on the ends thereof which overlie and bear against the outer faces of said boxes.

EUGENE L. SCHELLENS.